United States Patent
Lei et al.

(10) Patent No.: US 10,409,465 B2
(45) Date of Patent: Sep. 10, 2019

(54) SELECTING AREAS OF CONTENT ON A TOUCH SCREEN

(71) Applicant: International Business Machines Corporation, Armonk, NY (US)

(72) Inventors: Chang Lei, Shanghai (CN); Xuelin Wang, Shanghai (CN); Liang Yu, Shanghai (CN); Yan Zhang, Shangahi (CN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 14/962,577

(22) Filed: Dec. 8, 2015

(65) Prior Publication Data

US 2017/0160905 A1    Jun. 8, 2017

(51) Int. Cl.
G06F 3/048    (2013.01)
G06F 3/0484    (2013.01)
G06F 3/0481    (2013.01)
G06F 3/0482    (2013.01)
G06F 3/0488    (2013.01)

(52) U.S. Cl.
CPC ........ *G06F 3/04842* (2013.01); *G06F 3/0482* (2013.01); *G06F 3/0484* (2013.01); *G06F 3/04817* (2013.01); *G06F 3/04883* (2013.01)

(58) Field of Classification Search
CPC ............. G06F 3/04842; G06F 3/04817; G06F 3/0482; G06F 3/0484
See application file for complete search history.

(56) References Cited

U.S. PATENT DOCUMENTS

| | | | |
|---|---|---|---|
| 6,057,844 A * | 5/2000 | Strauss | G06F 3/0486 715/769 |
| 6,240,430 B1 | 5/2001 | Deike et al. | |
| 7,559,033 B2 | 7/2009 | Boss et al. | |
| 7,954,047 B2 | 5/2011 | Berger et al. | |
| 8,385,952 B2 * | 2/2013 | Friedman | G06F 3/0482 455/41.3 |
| 8,527,892 B2 * | 9/2013 | Sirpal | G06F 1/1616 715/769 |
| 8,650,507 B2 | 2/2014 | Westerman et al. | |

(Continued)

FOREIGN PATENT DOCUMENTS

EP    2527984 A1    11/2012

OTHER PUBLICATIONS

Roth et al., "Bezel Swipe: Conflict-Free Scrolling and Multiple Selection on Mobile Touch Screen Devices", CHI 2009, Apr. 8, 2009, Boston, Massachusetts, Copyright 2009 ACM, pp. 1523-1526.

(Continued)

*Primary Examiner* — Nicholas Augustine
(74) *Attorney, Agent, or Firm* — Alexander G. Jochym; Brian M. Restauro

(57) ABSTRACT

An indication to activate a first floating point area is received. An indication to select a first floating point area on a touch screen of a device is received. The first floating point is associated with a first section of content on the touch screen of the device. An indication to activate a second floating point area is received. An indication to select a second floating point area on a touch screen of a device is received. The second floating point is associated with a second section of content on the touch screen of the device.

16 Claims, 6 Drawing Sheets

(56) References Cited

U.S. PATENT DOCUMENTS

| | | | | |
|---|---|---|---|---|
| 8,687,023 | B2* | 4/2014 | Markiewicz | G06F 3/0485 |
| | | | | 345/173 |
| 8,707,170 | B2* | 4/2014 | Rives | G06F 3/04883 |
| | | | | 345/156 |
| 9,098,127 | B2 | 8/2015 | Rana et al. | |
| 2010/0122160 | A1 | 5/2010 | Chirakansakcharoen et al. | |
| 2011/0029547 | A1* | 2/2011 | Jeong | G06F 3/0482 |
| | | | | 707/758 |
| 2012/0092268 | A1* | 4/2012 | Tsai | G06F 17/24 |
| | | | | 345/173 |
| 2012/0229397 | A1 | 9/2012 | Cho et al. | |
| 2014/0173473 | A1* | 6/2014 | Hicks | G06F 3/04883 |
| | | | | 715/764 |
| 2014/0173482 | A1* | 6/2014 | Hicks | G06F 3/0483 |
| | | | | 715/769 |
| 2014/0173483 | A1* | 6/2014 | Hicks | G06F 3/0486 |
| | | | | 715/769 |
| 2015/0089356 | A1 | 3/2015 | Baklanovs et al. | |

OTHER PUBLICATIONS

"Conveniently select text, images, annotations, etc. In a PDF or any other text format on a touch based mobile/ tablet device", An IP.com Prior Art atabase Technical Disclosure, IP.com Electronic Publication Date: Mar. 1, 2011, IP.com No. IPCOM000204506D. 10 Pages.

* cited by examiner

SELECTING AREAS OF CONTENT ON A TOUCH SCREEN

BACKGROUND OF THE INVENTION

The present invention relates generally to the field of touch screen devices, and more particularly to selecting multiple areas of content on a touch screen device.

A touch screen is an input device normally layered on the top of an electronic visual display of an information processing system. A user can give input or control the information processing system through simple or multi-touch gestures by touching the screen with a special stylus/pen and/or one or more fingers. Some touch screens use ordinary or specially coated gloves to work while others use a special stylus/pen only. The user can use the touch screen to react to what is displayed and to control how it is displayed (for example by zooming the text size). The touch screen enables the user to interact directly with what is displayed, rather than using a mouse, touchpad, or any other intermediate device (other than a stylus, which is optional for most modern touch screens).

Touch screens are common in devices such as game consoles, personal computers, tablet computers, and smartphones. They may also be attached to computers or, as terminals, to networks. They also play a prominent role in the design of digital appliances such as personal digital assistants (PDAs), global positioning system (GPS) navigation devices, mobile phones, video games and some books (electronic books or E-books). The popularity of smartphones, tablets, and many types of information appliances is driving the demand and acceptance of common touch screens for portable and functional electronics. Touch screens are found in the medical field and in heavy industry, as well as for automated teller machines (ATMs), and kiosks such as museum displays or room automation, where keyboard and mouse systems do not allow a suitably intuitive, rapid, or accurate interaction by the user with the display's content.

SUMMARY

Embodiments of the present invention include a method, computer program product, and system for selecting multiple areas of content. In one embodiment, an indication to activate a first floating point area is received. An indication to select a first floating point area on a touch screen of a device is received. The first floating point is associated with a first section of content on the touch screen of the device. An indication to activate a second floating point area is received. An indication to select a second floating point area on a touch screen of a device is received. The second floating point is associated with a second section of content on the touch screen of the device.

DETAILED DESCRIPTION

Some embodiments of the present invention recognize that selecting content on a touch screen device may be a straight-forward process when only one section of content is selected at a time. However, selecting more than one section of content at one time may not be so trivial. On many electronic devices, such as tablet computers and smartphones, it may only be possible to select one area at a time requiring multiple "copy and paste" operations. Copy and paste is used to select (or copy) a section of content from an application and place (or paste) that content into a new location either in the same application or a new application.

Embodiments of the present invention recognize that there may be a method, computer program product, and system for selecting multiple areas of content on a touch screen device; i.e., selecting more than one area of content. Content may include items such as text, hyperlinks, and images. In an embodiment, using a "floating point" may enable a user to select multiple areas of content displayed on a touch screen device. The floating point is an indicator which may be moved and/or expanded at any place on the display to select content.

Figure 1:
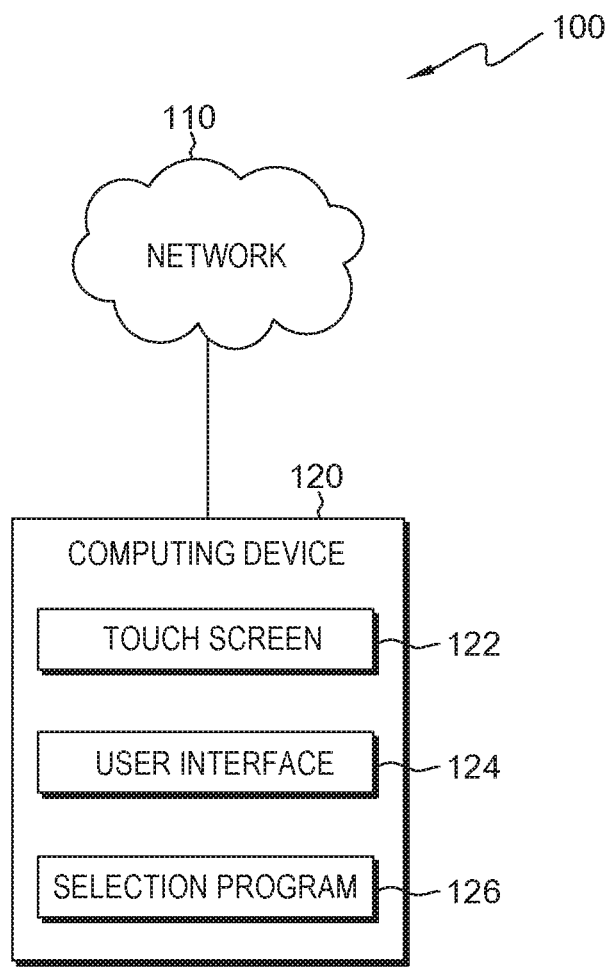
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes computing device 120 which includes touch screen 122, user interface 124, and selection program 126, connected to network 110. In example embodiments, computing environment 100 may include other computing devices not shown such as smartwatches, cell phones, smartphones, phablets, tablet computers, laptop computers, desktop computers, other computer servers or any other computer system known in the art, interconnected with computing device 120 over network 110.

In example embodiments, computing device 120 may connect to network 110 which enables computing device 120 to access other computing devices and/or data not directly stored on computing device 120. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 may be any combination of connections and protocols that will support communications between computing device 120 and other computing devices (not shown) within computing environment 100, in accordance with embodiments of the present invention.

In embodiments of the present invention, computing device 120 may be a laptop, tablet or netbook personal computer (PC), a desktop computer, a personal digital assistant (PDA), a smartphone, or any other hand-held, programmable electronic device capable of communicating with any computing device within computing environment 100. In certain embodiments, computing device 120 represents a computer system utilizing clustered computers and components (e.g., database server computers, application server computers, etc.) that act as a single pool of seamless resources when accessed by elements of computing environment 100. In general, computing device 120 is representative of any electronic device or combination of electronic devices capable of executing computer readable program instructions. Computing environment 100 may include any number of computing device 120. Computing device 120 may include components as depicted and described in further detail with respect to FIG. 4, in accordance with embodiments of the present invention. In an embodiment, computing device 120 may provide application hosting making applications available to a user via the World Wide Web (W3). In an embodiment, a user may access the W3 via user interface 124 on computing device 120.

According to various embodiments of the present invention, touch screen 122 is a technology used in conjunction with user interface 124, allowing computing device 120 to accept user input. Touchscreens are included in many electronic devices such as game consoles, tablet computers, phablets, smartphones, PDAs, and the like. In example embodiments, touch screen 122 may include the following technologies: resistive; surface acoustic wave; capacitive, including surface capacitance; projected capacitance; mutual capacitance; and self-capacitance; infrared grid; infrared acrylic projection; optical imaging; dispersive signal technology; acoustic pulse recognition; and the like. In one embodiment, touch screen 122 may include haptic feedback, an example of which is a vibratory response to the touch of user interface 124.

In an embodiment, user interface 124 provides an interface between a user of computing device 120, network 110 and any other devices connected to network 110. User interface 124 allows a user of computing device 120 to interact with the W3 and also enables the user to receive an indicator of one or more previous viewing locations and a summary of viewing history on the W3. In general, a user interface is the space where interactions between humans and machines occur. User interface 124 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 124 may also be mobile application software that provides an interface between a user of computing device 120 and network 110. Mobile application software, or an "app," is a computer program designed to run on smartphones, phablets, tablet computers and other mobile devices.

In embodiments of the present invention, selection program 126 may be a program, subprogram of a larger program, application, plurality of applications or mobile application software which functions to provide a method, computer program product, and system for selecting multiple areas of content on a touch screen device. Mobile application software, or an "app," is a computer program designed to run on smartphones, phablets, tablet computers and other mobile devices. In one embodiment, selection program 126 functions as a stand-alone program residing on computing device 120. In another embodiment, selection program 126 may be included as a part of an operating system (not shown) of computing device 120. In yet another embodiment, selection program 126 may work in conjunction with other programs, applications, etc., found on computing device 120 or in computing environment 100. In yet another embodiment, selection program 126 may be found on other computing devices (not shown) in computing environment 100 which are interconnected to computing device 120 via network 110.

According to embodiments of the present invention, selection program 126 allows a user of computing device 120 to select multiple sections of content on touch screen 122. In one embodiment, the finger of a user may be used to select content on a touch screen. In another embodiment, a stylus may be used to select content on a touch screen. In yet another embodiment, an input device, such as a mouse and/or keyboard, may be used by the user to select content displayed on a computer monitor. Selection program 126 allows the user of computing device 120 to copy the selected sections and to paste the selected sections into another location either on computing device 120 or to any other device (not shown) connected to network 110.

Figure 2:
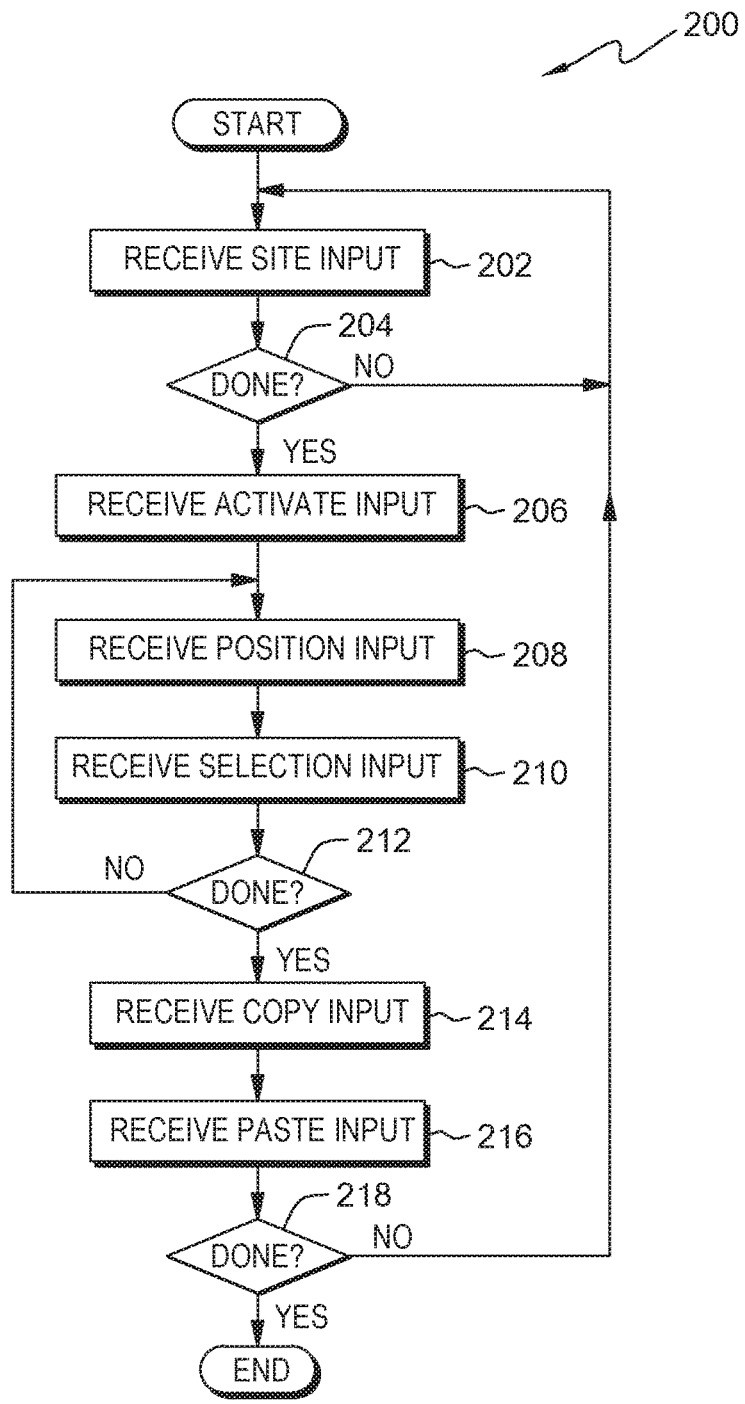
FIG. 2 is a flowchart depicting operational steps of a program that functions to select multiple areas of content on a touch screen device, in accordance with an embodiment of the present invention.

FIG. 2 is a flowchart of workflow 200 representing operational steps for selecting multiple areas of content on a touch screen device. In one embodiment, selection program 126 performs the operational steps of workflow 200. In an alternative embodiment, any other program, while working with selection program 126, may perform the operational steps of workflow 200. In an embodiment, selection program 126 may invoke operational steps 200 upon the request of a user. In an alternative embodiment, selection program 126 may invoke operational steps 200 automatically when a user opens an application on computing device 120. In an embodiment, any of the operational steps may be performed in any order. Example 300A in FIG. 3A, example 300B in FIG. 3B, example 300C in FIG. 3C, example 300D in FIG. 3D, and example 300E in FIG. 3E will be used throughout this document.

In an embodiment, selection program 126 receives site input (step 202). In other words, selection program 126 receives input that a user has opened at least one website on the W3 or one or more applications on the electronic device of the user. According to an embodiment of the present invention, a user opens a website for display on touch screen 122 on computing device 120 via user interface 124. For example, a user opens a pet website and searches for information.

In an embodiment, selection program 126 determines whether the user is done (decision step 204). In other words, selection program 126 determines if the user has finished opening sites from which to select content. In one embodiment, selection program 126 determines the user was not done selecting sites (decision step 204, NO branch) and selection program 126 returns to step 202 to receive input from the additional site or sites. In another embodiment, selection program 126 determines the user is done selecting sites (decision step 204, YES branch) and selection program 126 proceeds to step 206 to receive open input.

In an embodiment, selection program 126 receives an activate input (step 206). In other words, selection program 126 receives an input from the user to activate the floating point. In an embodiment, a user may activate the floating point with a hand gesture such as a pinching motion of two fingers on a touch screen. In another embodiment, activating floating points may be accomplished by selecting an "activate" icon in a menu of options for selection program 126. In yet another embodiment, the user tapping the touch screen may activate a floating point. In one embodiment, a user of computing device 120 activates the floating points from an options menu via user interface 124. For example, a user activates the floating points on the electronic device of a user.

Figure 3A:
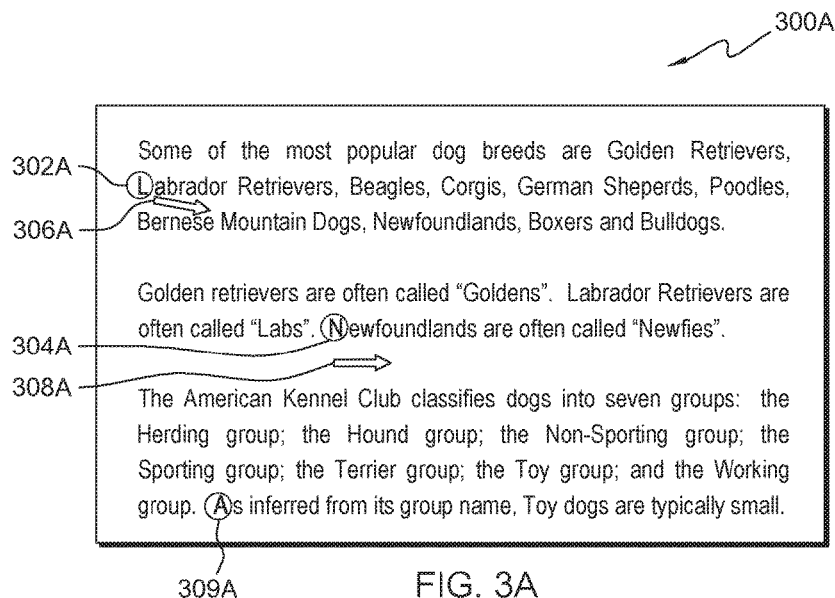
FIG. 3A is an example depiction of selecting multiple areas of content using floating points, in accordance with an embodiment of the present invention.
Figure 3B:
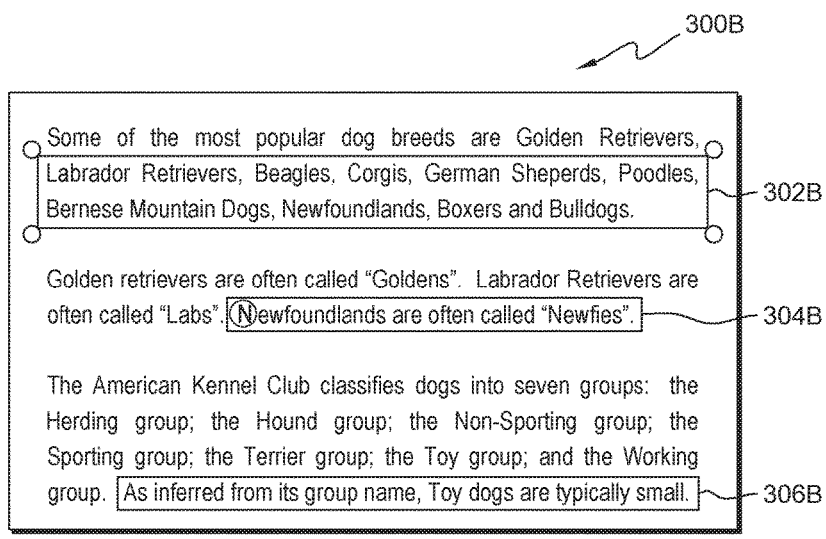
FIG. 3B is an example depiction of selected areas of content, in accordance with an embodiment of the present invention.
Figure 3C:
FIG. 3C is an example depiction of selecting an area of content with a brush handle, in accordance with an embodiment of the present invention.
Figure 3D:
FIG. 3D is an example depiction of a selected area of content, in accordance with an embodiment of the present invention.
Figure 3E:
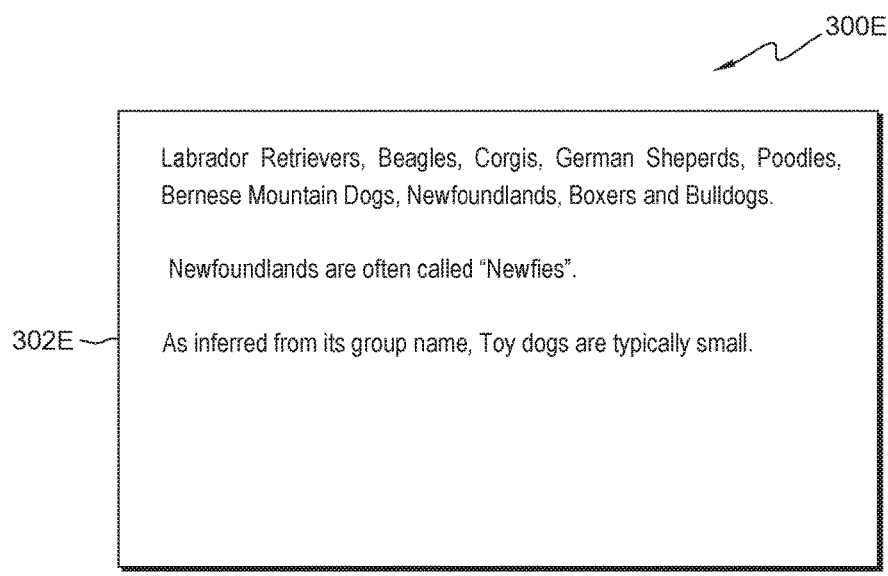
FIG. 3E is an example depiction of pasting selected areas of content into a text editor, in accordance with an embodiment of the present invention.

In an embodiment, selection program 126 receives position input (step 208). In other words, selection program 126 receives input from a user concerning where to locate the first floating point (i.e., a starting point) in the site the user intends to select content. In an embodiment, the floating point defines a location from which content may be selected. In an embodiment, a single tap on the touch screen by a user may place a floating point. In another embodiment, a user may place and hold a finger on the touch screen to place a floating point. In one embodiment, the user may place a single floating point. In another embodiment, the user may place multiple floating points. According to an embodiment of the present invention, a user places a floating point via user interface 124, displayed on touch screen 122, on computing device 120. For example, floating point 302A and floating point 304A, both in example 300A in FIG. 3A, are placed by a user onto a portion of a poem displayed on the touch screen of the electronic device of the user.

In an embodiment, selection program 126 receives selection input (step 210). In other words, selection program 126 received input from a user defining the content the user intends to select. In an embodiment, the finger of a user may be used to drag the floating point to define the section of content (i.e., moving the floating point to an end position). For example, floating point 302A in example 300A in FIG. 3A may be dragged down and to the right as indicated by arrow 306A in example 300A in FIG. 3A to define the two lines of text selected and shown as selection 302B in example 300B in FIG. 3B. In an embodiment, four floating points may be displayed which define the four corners of the selected content. In another embodiment, the floating point or points may no longer be displayed once the selection is made by a user. In another example, floating point 304A in example 300A in FIG. 3A may be dragged to the right as indicated by arrow 308A in example 300A in FIG. 3A resulting in selection 304B as shown in example 300B in FIG. 3B. As shown by selection 304B in example 300B in FIG. 3B, it is possible to only select a portion of a line. In yet another example, floating point 309A shown in example 300A in FIG. 3A may be tapped once by a finger of the user to select the entire line of the text as shown by selection 306B in example 300B in FIG. 3B.

In yet another embodiment, the floating point may be displayed with a handle to represent a paintbrush used for selecting content. For example, as shown in example 300C in FIG. 3C, brush handle 302C "grabs" floating point 304C. By clicking and dragging brush handle 302C down, a user is able to select the two lines of the poem as shown by selection 302D in example 300D in FIG. 3D. All possible embodiments for using floating points to select multiple sections of content are not described here. In various embodiments of the present invention, one skilled in the art may determine any number of paintbrush representations. Those skilled in the art may determine any number of embodiments for utilizing floating points to select multiple sections of content.

In an embodiment, selection program 126 determines whether a user is done selecting content (decision step 212). In other words, selection program 126 determines whether a user has completed selecting sections of content. In one embodiment, a user is not done selecting content (decision step 212, NO branch) and selection program 126 returns to step 208 to receive position input for selecting a second discrete area of content. In another embodiment, a user is done selecting content (decision step 212, YES branch) and selection program 126 proceeds to step 214 to receive copy input.

In an embodiment, selection program 126 receives a copy input (step 214). In other words, selection program 126 receives input from a user to copy the sections of content selected by a user to a virtual clipboard. The virtual clipboard is a software facility used for short-term data storage and/or data transfer between documents or applications, via copy and paste operations. It is most commonly a part of a GUI environment and is usually implemented as an anonymous, temporary data buffer, sometimes called the paste buffer, that can be accessed from most or all programs within the environment via defined programming interfaces. In an embodiment, selection program 126 receives input from a user to copy the selections made by the user via user interface 124 on computing device 120. For example, a user intends to copy the following selections shown in example 300B in FIG. 3B: selection 302B, selection 304B, and selection 306B.

In an embodiment, selection program 126 receives a paste input (step 216). In other words, selection program 126 receives input from a user to paste the sections of content selected by a user. According to embodiments of the present invention, the content may be pasted to an application, program, file, or any other location determined by the user. In an embodiment, selection program 126 receives input from a user to paste the selections made by the user via user interface 124 on computing device 120. For example, as shown by content 302E in example 300E in FIG. 3E, a user pastes the following selections shown in example 300B in FIG. 3B into a text editor: selection 302B, selection 304B, and selection 306B.

In an embodiment, selection program 126 determines whether a user is done selecting content (decision step 218). In other words, selection program 126 determines whether a user is done selecting content in the currently available sites opened in step 202. In one embodiment, selection program 126 determines a user is not done selecting content (decision step 218, NO branch) and selection program 126 returns to step 202 to receive new site input. In another embodiment, selection program 126 determines a user is done selecting content (decision step 218, YES branch) and selection program 126 ends.

Figure 4:
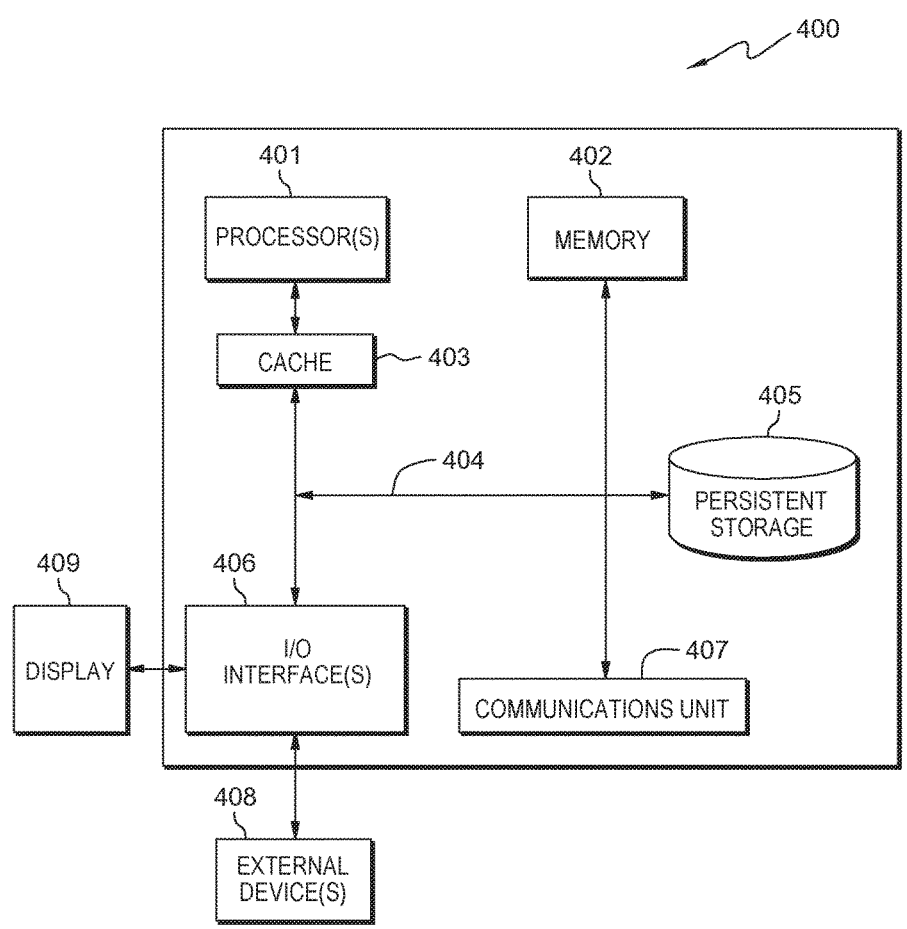
FIG. 4 depicts a block diagram of the components of the computing system of FIG. 1, in accordance with an embodiment of the present invention.

FIG. 4 depicts computer system 400 which is an example of a system that includes selection program 126. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ r the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selecting multiple areas of content, the method comprising:
receiving, by one or more computer processors, an indication to select content from a first document and a second document on a touch screen of a device, the first document and the second document having a plurality of continuous pages, wherein each respective page, of the plurality of continuous pages, includes one or more portions of selectable material;
selecting, by one or more computer processors, a first portion of selectable material from a first respective page of the first document and the second document;
selecting, by one or more computer processors, a second portion of selectable material from a separate noncontiguous location of the first respective page of the first document and another separate noncontiguous location of the first respective page of the second document;
copying, by one or more computer processors, the selected first portion of selectable material in the first document and the second document and the selected second portion of selectable material in the first document and the second document to an electronic clipboard; and
pasting, by one or more computer processors, the copied first portion of selectable material in the first document and the second document, and the copied second portion of selectable material in the first document and the second document as a single entity to an application.

2. The method of claim 1, wherein content is selected from the group consisting of: a text, a hyperlink, and an image.

3. The method of claim 1, wherein selecting the second portion of selectable material comprises:
selecting a second portion of selectable material from either another location on the first respective page of the first document and the second document or from another respective page of the plurality of continuous pages of the first document and the second document.

4. The method of claim 1, wherein the step of receiving, by one or more computer processors, an indication to select content from the first document and the second document on a touch screen of a device, the first document and the second document having a plurality of continuous pages, comprises:
receiving an indication to activate a first floating point;
receiving an indication that a user has moved a first floating point from a starting position to an ending position, wherein the starting position is a first position on the touch screen of the device that the user first places a floating point and the ending position is second position on the touch screen of the device that the user moved the first floating point; and
responsive to receiving an indication of the ending position, indicating the portion of selectable material on the touch screen of the device as an area of material defined by the first floating point starting position and the first floating point ending position.

5. The method of claim 4, wherein the indication to activate the first floating point is selected from the group consisting of: a hand gesture pinching at least two fingers of a user on the touch screen, selection of an icon in a menu on the device by the user, and the user tapping a finger of the user on the touch screen.

6. A computer program product for selecting multiple areas of content on a touch screen device, the computer program product comprising:
one or more computer readable storage media; and
program instructions stored on the one or more computer readable storage media, the program instructions comprising:
program instructions to receive an indication to select content from a first document and a second document on a touch screen of a device, the first document and the second document having a plurality of continuous pages, wherein each respective page, of the plurality of continuous pages, includes one or more portions of selectable material;

program instructions to select a first portion of selectable material from a first respective page of the first document and the second document;

program instructions to select a second portion of selectable material from a separate noncontiguous location of the first respective page of the first document and another separate noncontiguous location of the first respective page of the second document;

program instructions to copy the selected first portion of selectable material in the first document and the second document and the selected second portion of selectable material in the first document and the second document to an electronic clipboard; and program instructions to paste the copied first portion of selectable material in the first document and the second document, and the copied second portion of selectable material in the first document and the second document as a single entity to an application.

7. The computer program product of claim 6, wherein content is selected from the group consisting of: a text, a hyperlink, and an image.

8. The computer program product of claim 6, wherein selecting the second portion of selectable material comprises:

selecting a second portion of selectable material from either another location on the first respective page of the first document and the second document or from another respective page of the plurality of continuous pages of the first document and the second document.

9. The computer program product of claim 6, wherein program instructions to receive an indication to select content from the first document and the second document on a touch screen of a device, the first document and the second document having a plurality of continuous pages, comprises:

program instructions to receive an indication to activate a first floating point;

program instructions to receive an indication that a user has moved a first floating point from a starting position to an ending position, wherein the starting position is a first position on the touch screen of the device that the user first places a floating point and the ending position is second position on the touch screen of the device that the user moved the first floating point; and program instructions, responsive to receiving an indication of the ending position, to indicate the portion of selectable material on the touch screen of the device as an area of material defined by the first floating point starting position and the first floating point ending position.

10. The computer program product of claim 9, wherein the indication to activate the first floating point is selected from the group consisting of: a hand gesture pinching at least two fingers of a user on the touch screen, selection of an icon in a menu on the device by the user, and the user tapping a finger of the user on the touch screen.

11. A computer system for selecting multiple areas of content on a touch screen device, the computer system comprising:

one or more computer processors;
one or more computer readable storage media; and program instructions stored on the one or more computer readable storage media for execution by at least one of the one or more computer processors, the program instructions comprising:

program instructions to receive an indication to select content from a first document and a second document on a touch screen of a device, the first document and the second document having a plurality of continuous pages, wherein each respective page, of the plurality of continuous pages, includes one or more portions of selectable material;

program instructions to select a first portion of selectable material from a first respective page of the first document and the second document;

program instructions to select a second portion of selectable material from a separate noncontiguous location of the first respective page of the first document and another separate noncontiguous location of the first respective page of the second document;

program instructions to copy the selected first portion of selectable material in the first document and the second document and the selected second portion of selectable material in the first document and the second document to an electronic clipboard; and program instructions to paste the copied first portion of selectable material in the first document and the second document, and the copied second portion of selectable material in the first document and the second document as a single entity to an application.

12. The computer system of claim 11, wherein content is selected from the group consisting of: a text, a hyperlink, and an image.

13. The computer system of claim 11, wherein selecting the second portion of selectable material comprises:

selecting a second portion of selectable material from either another location on the first respective page of the first document and the second document or from another respective page of the plurality of continuous pages of the first document and the second document.

14. The method of claim 1, further comprising:

receiving, by one or more computer processors, an indication to select a third portion of selectable material from the first document, wherein:

the third portion of selectable material from the first document is associated with a new respective page of the plurality of continuous pages; and the indication to select the third portion of selectable material from the first document is a touch and a vertical drag on the touch screen of the device;

responsive to receiving the indication to select the third portion of selectable material from the first document on the touch screen of the device, determining, by one or more computer processors, a number of lines of content associated with the location of the vertical drag on the touch screen of the device; and selecting, by one or more computer processors, the number of lines of content as the third portion of selectable material from the first document.

15. The computer program product of claim 6, further comprising program instructions, stored on the one or more computer readable storage media, to:

receive an indication to select a third portion of selectable material from the first document, wherein:

the third portion of selectable material from the first document is associated with a new respective page of the plurality of continuous pages; and the indication to select the third portion of selectable material from the first document is a touch and a vertical drag on the touch screen of the device;

responsive to receiving the indication to select the third portion of selectable material from the first document on the touch screen of the device, determine a number of lines of content associated with the location of the vertical drag on the touch screen of the device; and select the number of lines of content as the third portion of selectable material from the first document.

16. The computer system of claim 11, further comprising program instructions, stored on the one or more computer readable storage media for execution by at least one of the one or more processors, to:

receive an indication to select a third portion of selectable material from the first document, wherein:

the third portion of selectable material from the first document is associated with a new respective page of the plurality of continuous pages; and the indication to select the third portion of selectable material from the first document is a touch and a vertical drag on the touch screen of the device;

responsive to receiving the indication to select the third portion of selectable material from the first document on the touch screen of the device, determine a number of lines of content associated with the location of the vertical drag on the touch screen of the device; and select the number of lines of content as the third portion of selectable material from the first document.

* * * * *